(12) United States Patent
Unno et al.

(10) Patent No.: US 7,608,981 B2
(45) Date of Patent: Oct. 27, 2009

(54) PIEZOELECTRIC THIN FILM VIBRATOR AND FABRICATION METHOD THEREOF, DRIVING APPARATUS AND PIEZOELECTRIC MOTOR USING THE SAME

(75) Inventors: Ken Unno, Tokyo (JP); Kenichi Tochi, Tokyo (JP); Masahiro Miyazaki, Tokyo (JP)

(73) Assignee: TDK Corporation, Tokyo (JP)

( * ) Notice: Subject to any disclaimer, the term of this patent is extended or adjusted under 35 U.S.C. 154(b) by 485 days.

(21) Appl. No.: 11/447,024

(22) Filed: Jun. 6, 2006

(65) Prior Publication Data

US 2006/0284517 A1    Dec. 21, 2006

(30) Foreign Application Priority Data

Jun. 15, 2005  (JP) ............................. 2005-174857

(51) Int. Cl.
    *H01L 41/08*    (2006.01)
(52) U.S. Cl. ............................. 310/323.03; 310/323.04; 29/25.35
(58) Field of Classification Search ............ 310/323.03, 310/323.04, 323.06
    See application file for complete search history.

(56) References Cited

U.S. PATENT DOCUMENTS

| | | | | |
|---|---|---|---|---|
| 4,779,019 A | * | 10/1988 | Onishi et al. ............ | 310/323.06 |
| 4,786,836 A | * | 11/1988 | Tokushima ............ | 310/323.07 |
| 5,056,201 A | * | 10/1991 | Kasuga et al. ............ | 29/25.35 |
| 5,814,919 A | * | 9/1998 | Okumura ................ | 310/323.12 |
| 6,215,375 B1 | | 4/2001 | Larson, III et al. | |
| 6,690,100 B1 | * | 2/2004 | Koroishi et al. ........ | 310/323.03 |
| 7,005,776 B1 | * | 2/2006 | Iino et al. ............... | 310/316.01 |
| 7,034,438 B2 | * | 4/2006 | Ohashi et al. .......... | 310/323.13 |
| 2002/0014810 A1 | * | 2/2002 | Maruyama ............ | 310/323.06 |
| 2002/0195892 A1 | * | 12/2002 | Okamoto et al. ............. | 310/81 |
| 2006/0055486 A1 | * | 3/2006 | Nakatsuka et al. .......... | 333/133 |
| 2006/0131999 A1 | * | 6/2006 | Nitto et al. .................. | 310/359 |
| 2006/0244341 A1 | * | 11/2006 | Uchino et al. .......... | 310/323.01 |
| 2008/0076211 A1 | * | 3/2008 | Casset et al. ................. | 438/127 |

FOREIGN PATENT DOCUMENTS

| | | | | |
|---|---|---|---|---|
| JP | 01043077 A | * | 2/1989 | |
| JP | 01209963 A | * | 8/1989 | |
| JP | 01227670 A | * | 9/1989 | |
| JP | 02151278 A | * | 6/1990 | |
| JP | 03164077 A | * | 7/1991 | |
| JP | 07143765 A | * | 6/1995 | |
| JP | A-09-223824 | | 8/1997 | |
| JP | 11289782 A | * | 10/1999 | |
| JP | A-2000-332568 | | 11/2000 | |

\* cited by examiner

*Primary Examiner*—Jaydi SanMartin
(74) *Attorney, Agent, or Firm*—Oliff & Berridge, PLC

(57) ABSTRACT

The invention relates to a piezoelectric thin film vibrator having a piezoelectric device formed by using thin film formation technology, a fabrication method thereof, a driving apparatus and a piezoelectric motor using the same, and an object is to provide a piezoelectric thin film vibrator which can provide an excellent piezoelectric characteristic at low cost, a fabrication method thereof, a driving apparatus and a piezoelectric motor using the same. A piezoelectric thin film vibrator is configured to have a resonator which generates a flexure traveling wave, a lower electrode which is formed on the resonator, a piezoelectric thin film which is formed by epitaxial growth on the lower electrode, and a plurality of upper electrode parts which is formed on the piezoelectric thin film.

12 Claims, 8 Drawing Sheets

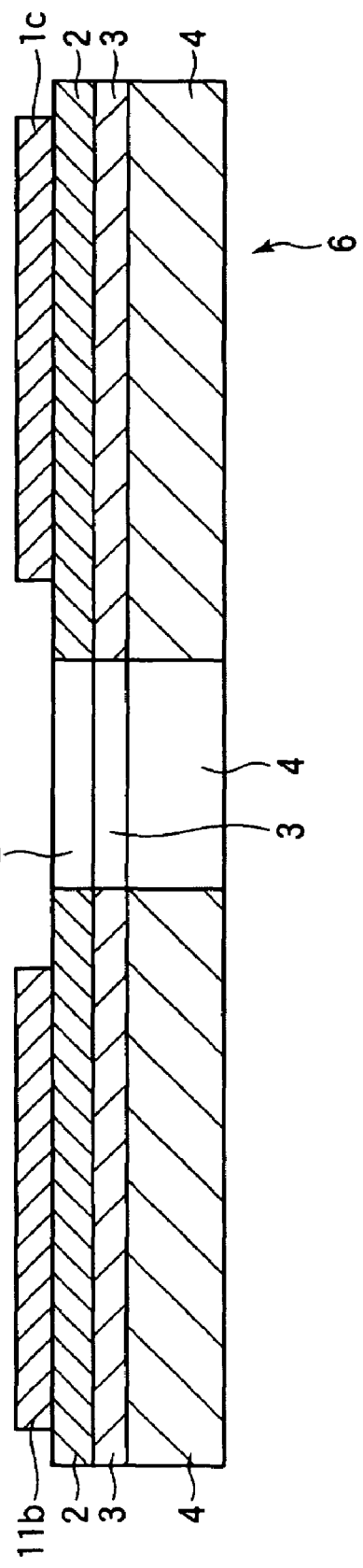

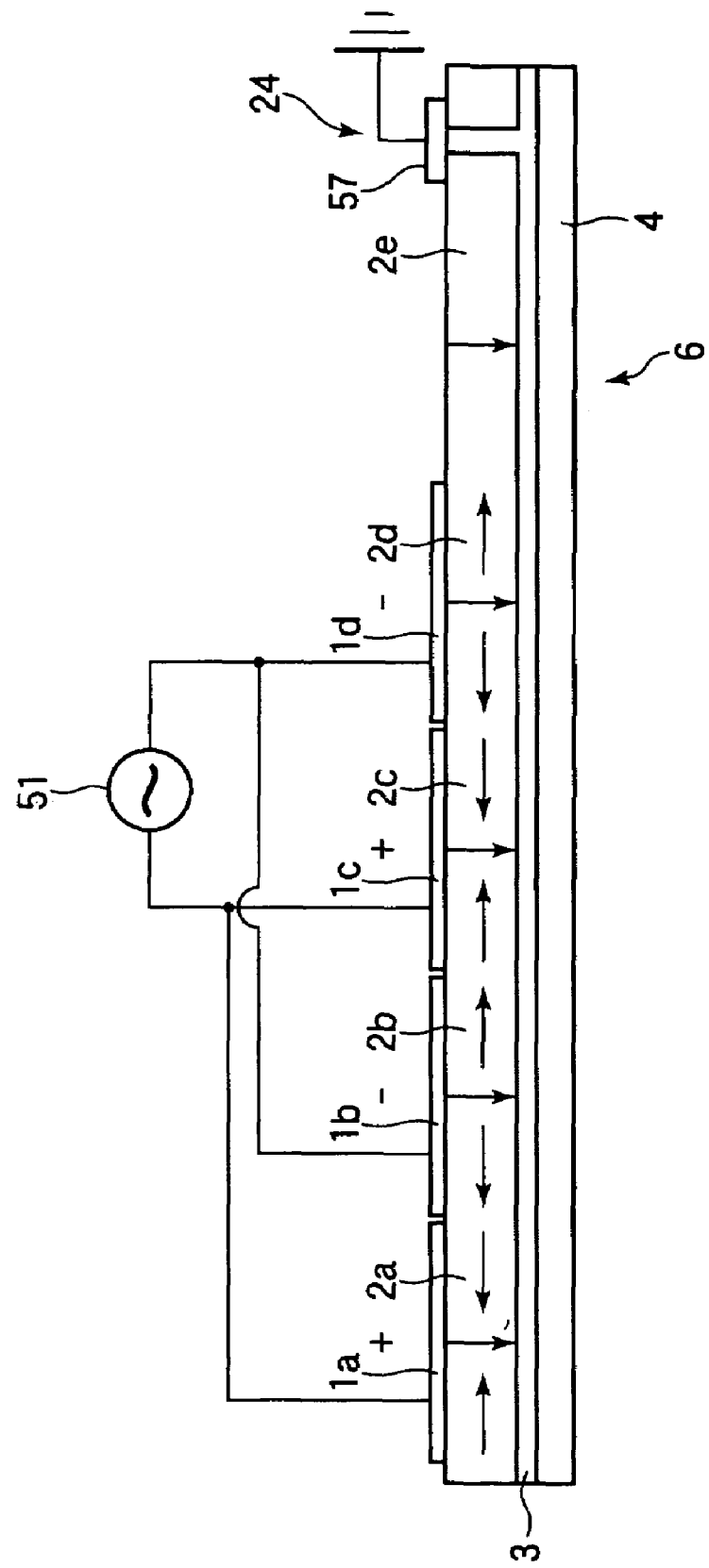

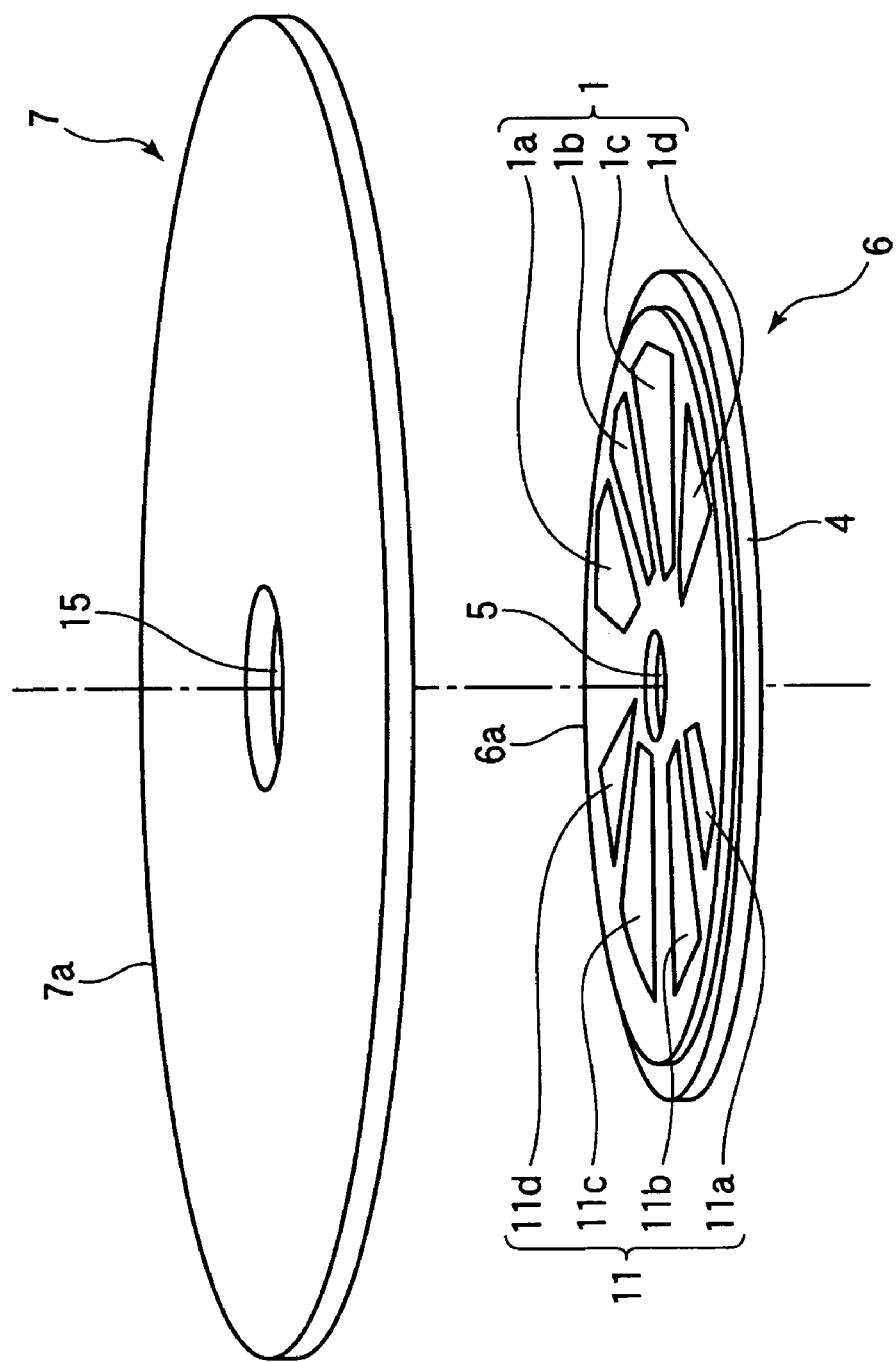

PIEZOELECTRIC THIN FILM VIBRATOR AND FABRICATION METHOD THEREOF, DRIVING APPARATUS AND PIEZOELECTRIC MOTOR USING THE SAME

BACKGROUND OF THE INVENTION

1. Field of the Invention

The present invention relates to a piezoelectric thin film vibrator having a piezoelectric device formed by using thin film formation technology, a fabrication method thereof, a driving apparatus and a piezoelectric motor using the same.

2. Description of the Related Art

A piezoelectric vibrator utilizing the piezoelectric effect of a piezoelectric device is used in an ultrasonic motor (piezoelectric motor), a piezoelectric actuator, etc. Generally, the piezoelectric device has a pair of electrodes and a piezoelectric product sandwiched between the electrodes. For example, for the piezoelectric product, a piezoelectric ceramic is used.

However, the piezoelectric device using the piezoelectric ceramic has a problem that the volume and the film thickness thereof are increased. When the volume and the film thickness of the piezoelectric product are increased, high drive voltage needs to be applied in order to obtain sufficient power out of the piezoelectric device. When high drive voltage is applied, the piezoelectric device tends to break. Furthermore, piezoelectric ceramic powder is separated from the piezoelectric ceramic, and it easily falls off. Thus, a problem arises that the fallen piezoelectric ceramic powder damages the piezoelectric vibrator to cause frequent failure.

For a method of solving the problems above, thin film formation technology is known in which a piezoelectric product is formed by using a vapor deposition apparatus, a sputtering apparatus, or a CVD apparatus. A piezoelectric thin film is used for the piezoelectric product to reduce the device thickness. Thus, the applied voltage can be made small, and the overall size of the piezoelectric device can be made small.

A piezoelectric thin film vibrator using the piezoelectric thin film has a resonator which generates flexure traveling waves and is formed of a silicon substrate, for example, a lower electrode which is formed on the resonator, a piezoelectric thin film which is formed on the lower electrode, and an upper electrode which is formed on the piezoelectric thin film. A predetermined alternating voltage is applied to the piezoelectric device, and thus the flexure traveling wave can be generated in the resonator.

However, when the piezoelectric thin film has a grain boundary or a defect therein, an excellent piezoelectric characteristic cannot be obtained. In addition to this, a problem arises that the piezoelectric characteristic tends to deteriorate because of aging.

In addition, for the piezoelectric product before that is formed of the piezoelectric ceramic or the piezoelectric thin film, in order to provide a desired piezoelectric characteristic in the piezoelectric product, a polarization process step is required after the piezoelectric device is formed, the polarization process step in which direct current voltage is applied to the piezoelectric product to align the orientation of spontaneous polarization of the piezoelectric product. On this account, a problem arises that the fabrication process steps of the piezoelectric device are complicated as well as fabrication costs become high.

Patent Reference 1: JP-A-9-223824

Patent Reference 2: JP-A-2000-332568

SUMMARY OF THE INVENTION

An object of the invention is to provide a piezoelectric thin film vibrator which can provide an excellent piezoelectric characteristic at low cost, a fabrication method thereof, a driving apparatus and a piezoelectric motor using the same.

The object can be achieved by a piezoelectric thin film vibrator including: a resonator which generates a traveling wave; a first electrode which is formed on the resonator; a piezoelectric thin film which is formed by epitaxial growth on the first electrode; and a plurality of second electrodes which is formed on the piezoelectric thin film.

In the piezoelectric thin film vibrator according to the invention, the piezoelectric thin film is formed of lead zirconate titanate.

In the piezoelectric thin film vibrator according to the invention, the resonator is formed of monocrystalline silicon.

In the piezoelectric thin film vibrator according to the invention, the plurality of the second electrodes is arranged in a segment of circle.

In the piezoelectric thin film vibrator according to the invention, the shape of the plurality of the second electrodes is a fan shape.

In the piezoelectric thin film vibrator according to the invention, the shape of the plurality of the second electrodes is a trapezoidal shape.

In the piezoelectric thin film vibrator according to the invention, the shape of the plurality of the second electrodes is a rectangular shape.

In addition, the object can be achieved by a driving apparatus including: the piezoelectric thin film vibrator according to the invention above; and an alternating current power source which applies alternating voltages to the plurality of the second electrodes, wherein phases of the alternating voltages are shifted by a half cycle between adjacent electrodes of the plurality of the second electrodes.

In addition, the object can be achieved by a piezoelectric motor including: a stator which has the driving apparatus according to the invention above; and a rotor which is disposed on the piezoelectric thin film vibrator.

In addition, the object can be achieved by a fabrication method of a piezoelectric thin film vibrator including the steps of: forming a metal thin film by epitaxial growth on a monocrystalline substrate to form a first electrode; depositing a piezoelectric thin film by epitaxial growth on the first electrode; and depositing a metal thin film on the piezoelectric thin film; and patterning the metal thin film in a predetermined shape to form a plurality of second electrodes.

In the fabrication method of the piezoelectric thin film vibrator according to the invention, photolithography is used to form the plurality of the second electrodes.

In the fabrication method of the piezoelectric thin film vibrator according to the invention, a back side of the monocrystalline substrate is ground to reduce the film thickness of the monocrystalline substrate to form a resonator.

In the fabrication method of the piezoelectric thin film vibrator according to the invention, after forming the plurality of the second electrodes, the back side of the monocrystalline substrate is ground.

In the fabrication method of the piezoelectric thin film vibrator according to the invention, the plurality of the second electrodes is arranged in a segment of circle.

In the fabrication method of the piezoelectric thin film vibrator according to the invention, the piezoelectric thin film vibrator is processed by sandblasting.

According to the invention, a piezoelectric thin film vibrator which can provide an excellent piezoelectric characteristic at low cost, a fabrication method thereof, a driving apparatus and a piezoelectric motor using the same can be implemented.

BRIEF DESCRIPTION OF THE DRAWINGS

The teachings of the invention can be readily understood by considering the following detailed description in conjunction with the accompanying drawings, in which:

FIG. 3 is a cross section illustrating the configuration of the piezoelectric thin film vibrator according to an embodiment of the invention;

FIG. 4 is a cross section illustrating the configuration of the piezoelectric thin film vibrator according to an embodiment of the invention;

FIG. 7 is a perspective view illustrating the configuration of a piezoelectric motor according to an embodiment of the invention.

DETAILED DESCRIPTION OF THE INVENTION

Figure 1:
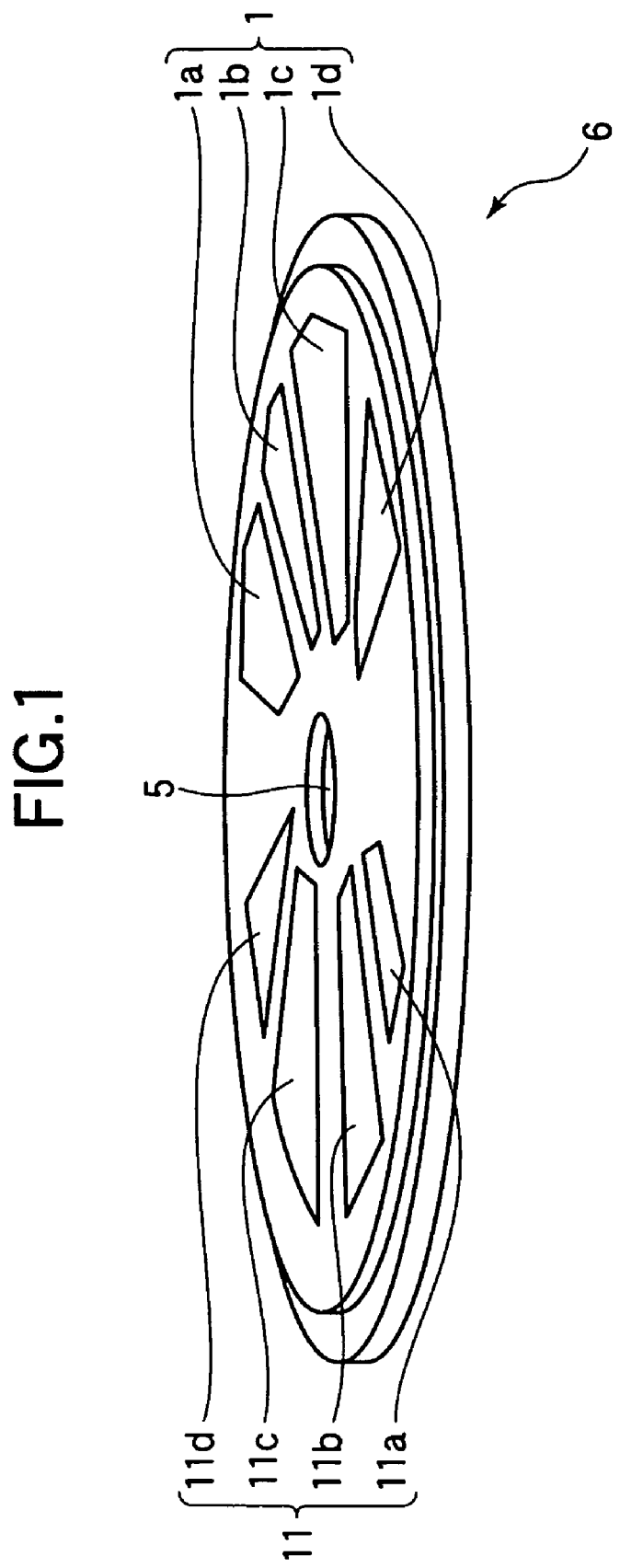
FIG. 1 is a perspective view illustrating the configuration of a piezoelectric thin film vibrator according to an embodiment of the invention.
Figure 2:
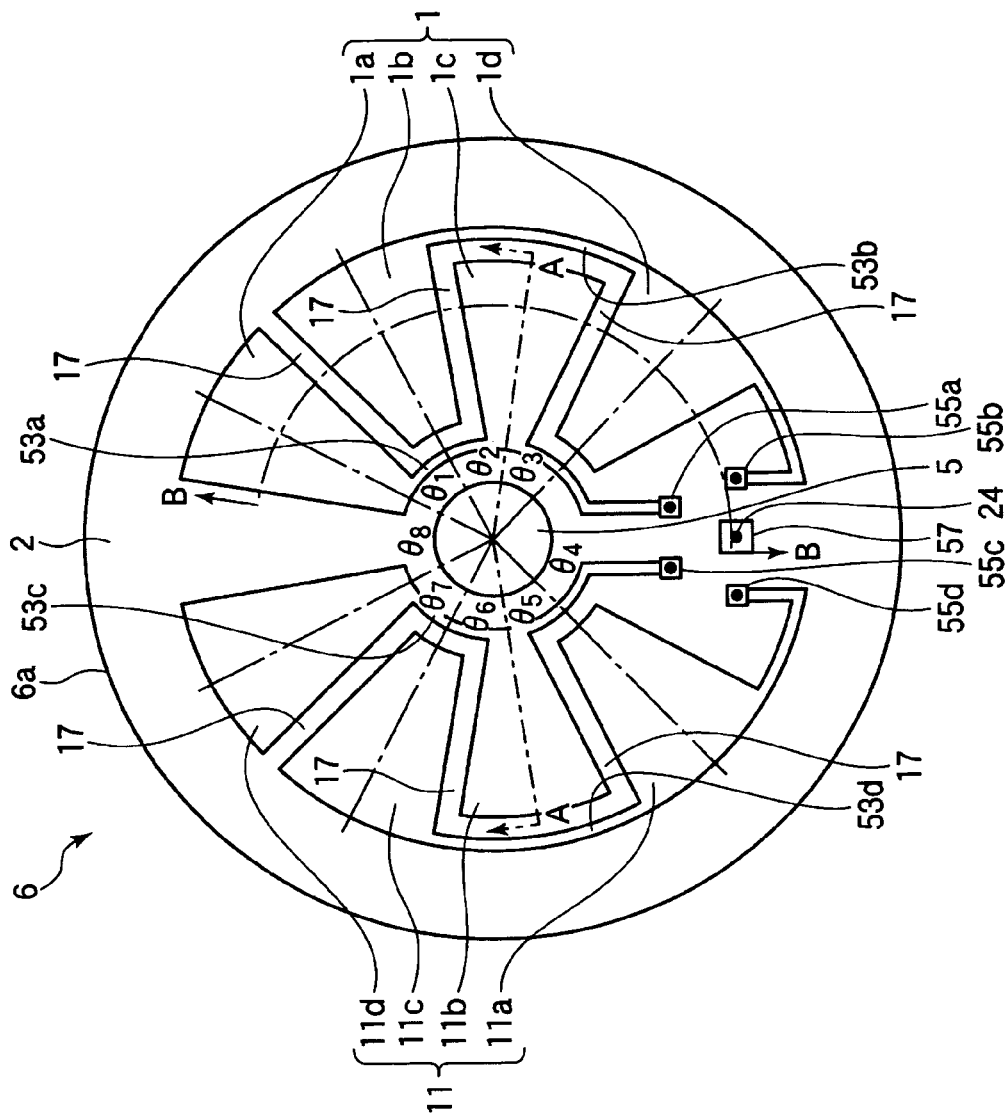
FIG. 2 is a plan view illustrating the configuration of the piezoelectric thin film vibrator according to an embodiment of the invention.

A piezoelectric thin film vibrator, a fabrication method thereof, a driving apparatus and a piezoelectric motor using the same according to an embodiment of the invention will be described with reference to FIGS. 1 to 8C. FIG. 1 is a perspective view illustrating the configuration of the piezoelectric thin film vibrator according to the embodiment. FIG. 2 is a plan view illustrating a piezoelectric thin film vibrator 6 according to the embodiment. In addition, FIG. 3 is a cross section sectioned at line A-A shown in FIG. 2. FIG. 4 is a diagram schematically illustrating a cross section sectioned at line B-B shown in FIG. 2. As shown in FIG. 1 to FIG. 3, the piezoelectric thin film vibrator 6 according to the embodiment has a resonator 4 which is formed of a monocrystalline silicon substrate and generates flexure traveling waves, a lower electrode (first electrode) 3 which is formed on the resonator 4, a piezoelectric thin film 2 which is formed on the lower electrode 3 by epitaxial growth, and upper electrode parts 1 and 11 which are formed on the piezoelectric thin film 2.

The piezoelectric thin film vibrator 6 is formed in a thin plate shape, and has a circular perimeter. At the center part of the piezoelectric thin film vibrator 6, a circular through hole 5 is formed in which the center thereof is nearly matched with the center of a perimeter circle 6a of the piezoelectric thin film vibrator 6. On the resonator 4, the lower electrode 3 is formed by epitaxial growth. On the lower electrode 3, the piezoelectric thin film 2 is formed which is configured of lead zirconate titanate, for example, formed by epitaxial growth.

On the piezoelectric thin film 2, the upper electrode parts 1 and 11 are formed. The upper electrode part 1 has upper electrodes (second electrodes) 1a, 1b, 1c and 1d in the same shape. Similarly, the upper electrode part 11 has upper electrodes (second electrodes) 11a, 11b, 11c and 11d in the same shape as that of the upper electrodes 1a to 1d. The upper electrodes 1a, 1b, 1c and 1d and the upper electrodes 11a, 11b, 11c and 11d have a fan shape in which the perimeter circle 6a side of the fan shape is in an arc shape. The upper electrodes 1a, 1b, 1c and 1d and the upper electrodes 11a, 11b, 11c and 11d are arranged in this order clockwise in a segment of circle.

Between the adjacent electrodes in the upper electrodes 1a to 1d, a slit 17 is each formed which insulates the electrodes from each other. An angle $\theta 1$ is about $\pi/5$ (rad), which a phantom line that extends from the center of the piezoelectric thin film vibrator 6 (in FIG. 2, the center of the perimeter circle 6a) in the radial direction and divides the upper electrode 1a into equal halves forms with a phantom line that divides the upper electrode 1b into equal halves. Similarly, an angle $\theta 2$ is about $\pi/5$, which the phantom line that divides the upper electrode 1b into equal halves forms with a phantom line that divides the upper electrode 1c into equal halves. In addition, an angle $\theta 3$ is also about $\pi/5$, which the phantom line that divides the upper electrode 1c into equal halves forms with a phantom line that divides the upper electrode 1d into equal halves.

Between the adjacent electrodes in the upper electrodes 11a to 11d, the slit 17 is each formed which insulates the electrodes from each other. An angle $\theta 5$ is about $\pi/5$ (rad), which a phantom line that extends from the center of the piezoelectric thin film vibrator 6 (in FIG. 2, the center of the perimeter circle 6a) in the radial direction and divides the upper electrode 11a into equal halves forms with a phantom line that divides the upper electrode 11b into equal halves. Similarly, an angle $\theta 6$ is about $\pi/5$, which the phantom line that divides the upper electrode 11b into equal halves forms with a phantom line that divides the upper electrode 11c into equal halves. In addition, an angle $\theta 7$ is also about $\pi/5$, which the phantom line that divides the upper electrode 11c into equal halves forms with a phantom line that divides the upper electrode 11d into equal halves.

An angle $\theta 4$ is about $\pi/2$ (rad), which the phantom line that divides the upper electrode 1d into equal halves forms with the phantom line that divides the upper electrode 11a into equal halves. More specifically, the angle $\theta 4$ is about 2.5 times the angle $\theta 1$. In addition, an angle $\theta 8$ is about $3\pi/10$ (rad), which the phantom line that divides the upper electrode 11d into equal halves forms with the phantom line that divides the upper electrode 1a into equal halves. More specifically, the angle $\theta 8$ is about 1.5 times the angle $\theta 1$.

In the space between the upper electrode 1d and the upper electrode 11a, electrode terminals 55a, 55b, 55c and 55d and an electrode terminal 57 are formed. A contact hole 24 is formed by opening the piezoelectric thin film 2 on the lower electrode 3, and the electrode terminal 57 is electrically connected to the lower electrode 3 through the contact hole 24. The lower electrode 3 is connected to a ground through the electrode terminal 57.

The upper electrodes 1a and 1c are electrically connected to a lead electrode 53a which is formed around near the through hole 5. The lead electrode 53a is electrically connected to the electrode terminal 55a. The upper electrodes 1b and 1d are electrically connected to a lead electrode 53b which is formed on the perimeter side. The lead electrode 53b is electrically connected to the electrode terminal 55b.

The upper electrodes 11a and 11c are electrically connected to a lead electrode 53d which is formed on the perimeter side. The lead electrode 53d is electrically connected to the electrode terminal 55d. The upper electrodes 11b and 11d are electrically connected to a lead electrode 53c which is formed around near the through hole 5. The lead electrode 53c is electrically connected to the electrode terminal 55c.

The crystal orientation of the thin film formed by epitaxial growth is aligned in the orientation that has the specific relationship with the crystal orientation of the base. The lower electrode 3 is formed by epitaxial growth on the (100) crystal plane which is the front surface of a monocrystalline silicon substrate to be the resonator 4. The lower electrode 3 is aligned in the <100> crystal direction. The piezoelectric thin film 2 is formed on the lower electrode 3 by epitaxial growth. The piezoelectric thin film 2 is aligned in the <001> crystal direction, and is in single alignment with the c crystal plane. Therefore, the polarization orientation of the piezoelectric thin film 2 is aligned with the normal direction of the substrate surface of the piezoelectric thin film vibrator 6 (in FIG. 4, the polarization orientation is schematically shown by a plurality of arrows that the tip ends are downward). Since the polarization orientation of the piezoelectric thin film 2 is aligned with a predetermined orientation, the piezoelectric thin film 2 having an excellent piezoelectric characteristic can be obtained as well as the polarization process is unnecessary. Thus, the fabrication process steps of the piezoelectric device become simple, and the piezoelectric thin film vibrator 6 having an excellent piezoelectric characteristic can be obtained at low cost and high yields.

As shown in FIG. 4, when the lower electrode 3 is maintained at the ground potential and positive voltage is applied to the upper electrodes 1a and 1c (in FIG. 4, denoted by "+"), a compressive force is generated in piezoelectric thin films 2a and 2c between the upper electrodes 1a and 1c and the lower electrode 3, as denoted by two arrows that the arrow tip ends face to each other in FIG. 4. Thus, the area near the piezoelectric thin films 2a and 2c of the resonator 4 is warped in a downward projection in FIG. 4. On the other hand, when negative voltage is applied to the upper electrodes 1b and 1d (in FIG. 4, denoted by "–"), an expansion force is generated in piezoelectric thin films 2b and 2d between the upper electrodes 1b and 1d and the lower electrode 3, as denoted by two arrows that the arrow tip ends face in the opposite directions each other in FIG. 4. Thus, the area near the piezoelectric thin films 2b and 2d of the resonator 4 is warped in an upward projection in FIG. 4

Reversely, when negative voltage is applied to the upper electrodes 1a and 1c, an expansion force is generated in the piezoelectric thin films 2a and 2c formed between the upper electrodes 1a and 1c and the lower electrode 3. Thus, the area near the piezoelectric thin films 2a and 2c of the resonator 4 is warped an upward projection in FIG. 4. In addition, when positive voltage is applied to the upper electrodes 1b and 1d, a compressive force is generated in the piezoelectric thin films 2b and 2d formed between the upper electrodes 1b and 1d and the lower electrode 3. Thus, the area near the piezoelectric thin films 2b and 2d of the resonator 4 is warped in a downward projection in FIG. 4.

To the upper electrodes 1a, 1b, 1c and 1d arranged in a segment of a circle, voltages having polarity opposite to each other are applied to the upper electrodes 1a and 1c and to the upper electrodes 1b and 1d, and thus uneven flexure is generated in the areas of the resonator 4 corresponding to the upper electrodes 1a, 1b, 1c and 1d.

Alternating voltage V1 having an rms value of 3.3 V=A $\sin(\omega t)$ (V) is applied between the upper electrodes 1a and 1c and the lower electrode 3, and alternating voltage V2=A $\sin(\omega t+\pi)$ (V) is applied between the upper electrodes 1b and 1d and the lower electrode 3 (here, A is the maximum amplitude, $\omega$ is the angular frequency, and t is the time period).

Then, a flexure vibration is generated in the piezoelectric thin films 2a and 2c, which the extension and the compressive force are repeated at a frequency f1=$\omega/2\pi$(Hz). On the other hand, a flexure vibration is generated in the piezoelectric thin films 2b and 2d, which the phase is shifted only by $\pi$ (half cycle) at the frequency f1 the same as that of the flexure vibration in the piezoelectric thin films 2a and 2c.

These flexure vibrations propagate through the entire resonator 4, and result in a standing wave that vibrates in the normal direction of the substrate surface of the piezoelectric thin film vibrator 6 at the frequency f1=$\omega/2\pi$ (Hz). At this time, the wavelength of the standing wave in the perimeter circle 6a of the piezoelectric thin film vibrator 6 is one-fifth of the length of the perimeter circle 6a.

On the other hand, alternating voltage V3 having an rms value of 3.3 V=A $\sin\{\omega t-(\pi/2)\}$ (V) is applied between the upper electrodes 11a and 11c and the lower electrode 3, and V4=A $\sin\{\omega t+(\pi/2)\}$ (V) is applied between the upper electrodes 11b and 11d and the lower electrode 3. Then, in the piezoelectric thin film 2 between the upper electrodes 11a to 11d and the lower electrode 3, a flexure vibration is generated which is repeated at the frequency f1=$\omega/2\pi$ (Hz), and a flexure vibration is generated which the phase is shifted only by $\pi$ at the frequency f1 the same as that flexure vibration.

These flexure vibrations propagate through the entire resonator 4, and result in a standing wave that vibrates in the normal direction of the substrate surface of the piezoelectric thin film vibrator 6 at the frequency f1=$\omega/2\pi$ (Hz). At this time, the wavelength of the standing wave in the perimeter circle 6a of the piezoelectric thin film vibrator 6 is one-fifth of the length of the perimeter circle 6a.

The phase of the standing wave which is generated by the alternating voltage applied to the upper electrode part 1 is varied by $\pi/2$ from the phase of the standing wave which is generated by the alternating voltage applied to the upper electrode part 11. The interference caused by two standing waves having the phases varied by $\pi/2$ generates a flexure traveling wave in the entire piezoelectric thin film vibrator 6. The traveling direction of the flexure traveling wave is the perimeter direction of the piezoelectric vibrator 6 (in FIG. 2, the direction vertical to the radial direction of the perimeter circle 6a).

Next, a fabrication method of the piezoelectric thin film vibrator according to the embodiment will be described with reference to FIGS. 5A to 5F. In addition, FIGS. 5A to 5F show the right half of the cross section of the piezoelectric thin film vibrator 6 shown in FIG. 3.

Figure 5A:
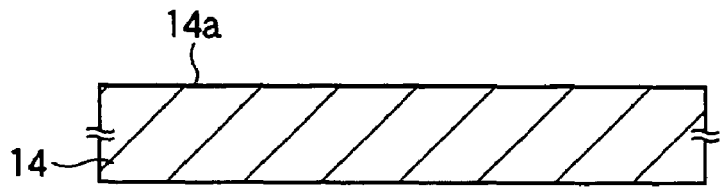
FIGS. 5A to 5F are diagrams illustrating a fabrication method of a piezoelectric thin film vibrator according to an embodiment of the invention.

First, a monocrystalline silicon substrate 14 is set in the holder of a vapor deposition apparatus, as the (100) crystal plane is exposed (see FIG. 5A). Here, preferably, a mirror finished wafer is used for the substrate front surface 14a, and the substrate front surface 14a is cleaned by etching. More specifically, it is cleaned by etching with 40% ammonium fluoride aqueous solution etc. In addition, since the cleaned monocrystalline silicon substrate 14 has extremely high reactivity, a predetermined surface treatment is preferably applied thereon to protect it from contamination etc.

Subsequently, on the substrate front surface 14a of the monocrystalline silicon substrate 14, a $ZrO_2$ film having a thickness of 0.01 μm and an $Y_2O_3$ film having a thickness of 0.04 μm are in turn grown by epitaxial growth to form an oxide film (not shown in FIGS. 5A to 5F). Here, the $ZrO_2$ film is an epitaxial film configured of zirconium oxide ($ZrO_2$), and the $Y_2O_3$ film is an epitaxial film configured of yttrium oxide ($Y_2O_3$). More specifically, onto the front surface 14a of the monocrystalline silicon substrate 14 heated at a temperature of 400° C. or above, Zr is supplied from a Zr evaporation unit and Y is supplied from an Y evaporation unit to deposit the $ZrO_2$ film and the $Y_2O_3$ film under oxygen atmosphere obtained from a gas feed unit. As described above, the plane to grow the $ZrO_2$ film formed by epitaxial growth results in the (001) crystal plane, and the plane to grow the $Y_2O_3$ film results in the (100) crystal plane.

In addition, when a film is deposited on a monocrystalline substrate having a substrate surface area of 10 cm$^2$ or greater, for example, on a large monocrystalline substrate surface area having a diameter of 2 inch, the monocrystalline silicon substrate 14 is rotated by a motor to supply high oxygen partial pressure to throughout the substrate surface, allowing film fabrication in the large area. At this time, desirably, the number of revolutions of the substrate is 10 rpm or above. This is because the film thickness is distributed in the substrate surface when the number of revolutions is small. The number of revolutions of the substrate does not have a particular upper limit, but in general, it is about 120 rpm because of the mechanism of a vacuum unit.

Figure 5B:
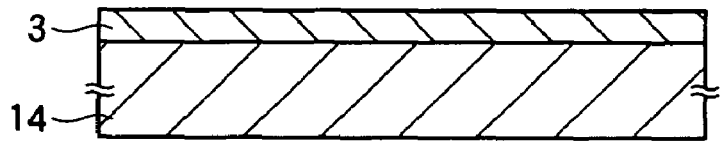

Subsequently, a metal thin film having a thickness of 0.2 μm is grown by epitaxial growth on the oxide film to form the lower electrode (first electrode) 3 (see FIG. 5B). More specifically, onto the top of the monocrystalline silicon substrate 14, Pt is supplied from a Pt evaporation unit to deposit a metal thin film configured of Pt under the oxygen plasma atmosphere. As described above, the Pt metal thin film formed by epitaxial growth is aligned in the <100> crystal direction.

Figure 5C:
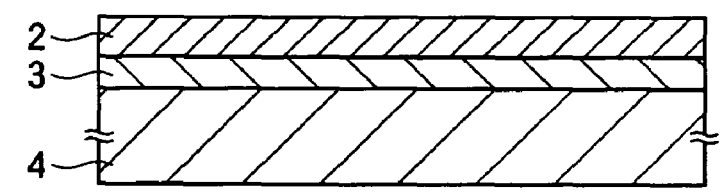

Subsequently, on the lower electrode 3, a PLT film having a thickness of 0.02 μm and a PZT film having a thickness of 2.5 μm are in turn grown by epitaxial growth to deposit the piezoelectric thin film 2 (see FIG. 5C). Here, the PLT film is an epitaxial film configured of lead titanate (PLT) doped with La, and the PZT film is an epitaxial film configured of lead zirconate titanate (PZT). More specifically, onto the top of the heated monocrystalline silicon substrate 14, Ti is selectively supplied from a Ti evaporation unit, La from a La evaporation unit, Pb from a Pb evaporation unit, and Zr from a Zr evaporation unit to deposit the PLT film and the PZT film under the oxygen plasma atmosphere. In these PLT film and PZT film, the growth orientation thereof (thickness direction) is the <001> crystal direction, and is in single alignment with the c crystal plane. More specifically, the piezoelectric thin film 2 has a perovskite type crystalline structure.

Figure 5D:
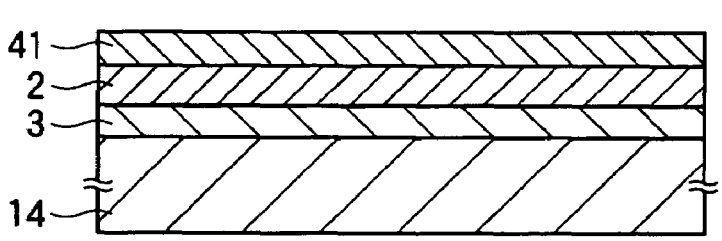

Subsequently, on the piezoelectric thin film 2, a metal thin film 41 having a thickness of 0.2 μm is grown by epitaxial growth (see FIG. 5D). More specifically, onto the top of the monocrystalline silicon substrate 14, Pt is supplied from a Pt evaporation unit to deposit the metal thin film 41 configured of Pt under the oxygen plasma atmosphere.

Figure 5E:
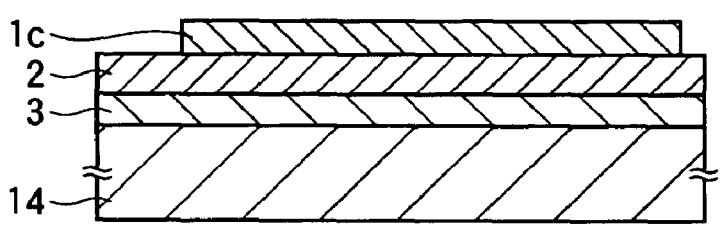
Figure 5F:
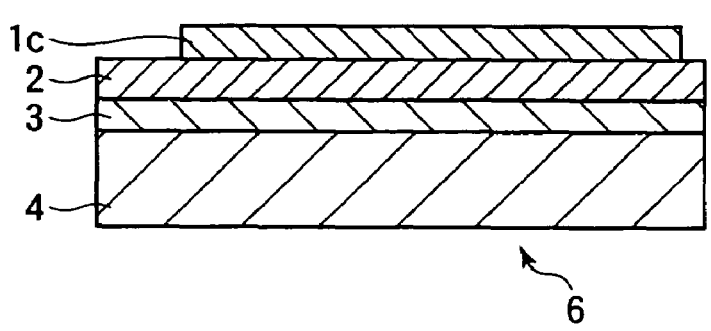

Subsequently, with the use of photolithography, the metal thin film 41 is patterned in a predetermined shape to form the upper electrode parts 1 and 11 (see FIG. 5E. In FIG. 5E, the upper electrode 1c is only shown). More specifically, a positive photoresist is coated over throughout the surface of the metal thin film 41. Then, the resist is patterned to form a resist pattern, the resist pattern is used as an etching mask to etch the metal thin film 41, and then the upper electrode parts 1 and 11 are formed. The upper electrode parts 1 and 11 are arranged in a segment of a circle.

Subsequently, the center part is ground by sandblasting or photolithography to form the through hole 5. Furthermore, the back side of the monocrystalline silicon substrate 14 is ground by sandblasting, polishing, or etching to reduce the film thickness of the monocrystalline silicon substrate 14 up to 50 μm to form the resonator 4 (see FIG. 5F). As described above, the fabrication of the piezoelectric thin film vibrator 6 is completed in which the lower electrode 3, the piezoelectric thin film 2, and the upper electrode parts 1 and 11 are in turn laminated on the resonator 4.

Figure 6:
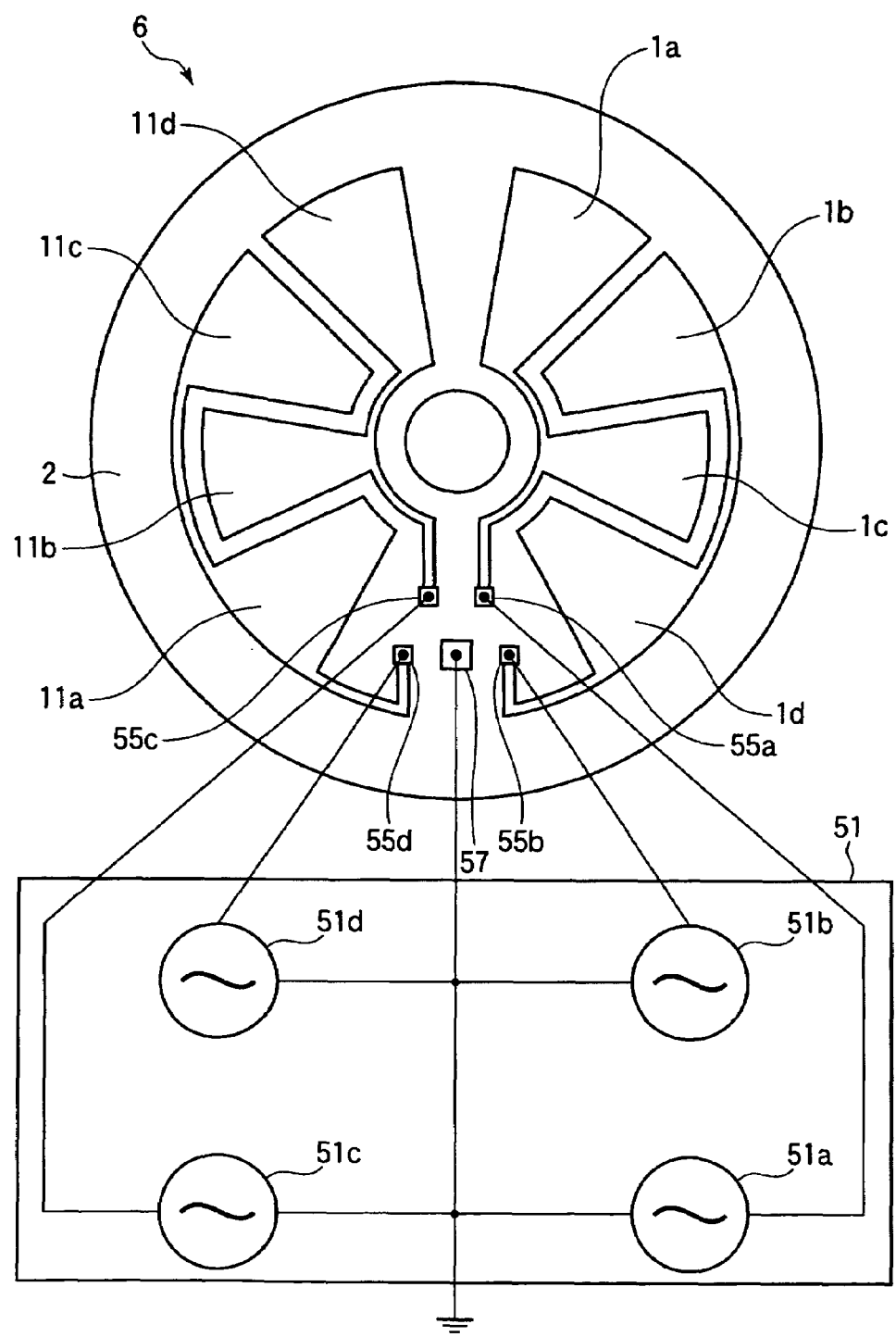
FIG. 6 is a plan view illustrating the configuration of a driving apparatus according to an embodiment of the invention.

Next, a driving apparatus according to the embodiment will be described with reference to FIG. 6. FIG. 6 shows the configuration of the driving apparatus according to the embodiment. As shown in FIG. 6, the driving apparatus according to the embodiment has the piezoelectric thin film vibrator 6 and an alternating current power source part 51. The alternating current power source part 51 has alternating current power sources 51a, 51b, 51c and 51d.

The alternating current power source 51a is electrically connected to the upper electrodes 1a and 1c through the electrode terminal 55a. The alternating current power source 51b is electrically connected to the upper electrodes 1b and 1d through the electrode terminal 55b. The alternating current power source 51d is electrically connected to the upper electrodes 11a and 11c through the electrode terminal 55d. The alternating current power source 51c is electrically connected to the upper electrodes 11b and 11d through the electrode terminal 55c.

The driving apparatus according to the embodiment is used for a piezoelectric motor, described later, as well as it may be used in such a way that a rotational recording medium is mounted on the piezoelectric thin film vibrator 6 through a fluid such as liquid or gas (for example, air) and it applies driving force to rotate the medium in a noncontact manner through the fluid. The fluid moves in the direction opposite to the traveling direction of the flexure traveling wave, and the medium is rotated in accordance with the direction in which the fluid rotates and moves.

Next, a piezoelectric motor according to the embodiment will be described with reference to FIG. 7. FIG. 7 is a perspective view illustrating the configuration of the piezoelectric motor according to the embodiment. As shown in FIG. 7, the piezoelectric motor according to the embodiment has a stator which has the driving apparatus according to the embodiment (in FIG. 7, the piezoelectric thin film vibrator 6 is only shown), and a rotor 7 disposed on the piezoelectric thin film vibrator 6.

The rotor 7 is formed in a thin plate shape, and has a circular perimeter. At the center part of the rotor 7, a circular through hole 15 is formed which has the center nearly matched with a perimeter circle 7a of the rotor 7. A cylindrical shaft, not shown, penetrates through the through hole 5 and the through hole 15, and the rotation axis of the rotor 7 is nearly matched with the center axis of the piezoelectric thin film vibrator 6 (in the drawing, denoted by an alternate long and short dashed line). In the piezoelectric motor according to the embodiment, the surface on which the upper electrode part 1 of the piezoelectric thin film vibrator 6 is formed faces the rotor 7, but the surface on which the resonator 4 is formed may face the rotor 7.

As described above, two standing waves having the phases varied by π/2(rad) interfere with each other to generate the flexure traveling wave in the entire piezoelectric thin film vibrator 6. The traveling direction of the flexure traveling wave is the perimeter direction of the piezoelectric vibrator 6 (in FIG. 7, the direction vertical to the radial direction of the perimeter circle 6a in the substrate surface). When the piezoelectric thin film vibrator 6 is pressed against the rotor 7, the rotor 7 is rotated in the direction opposite to the traveling direction of the flexure traveling wave generated in the piezoelectric thin film vibrator 6 by friction.

The invention is not limited to the embodiment above, which can be modified variously, not limited thereto.

Figure 8A:
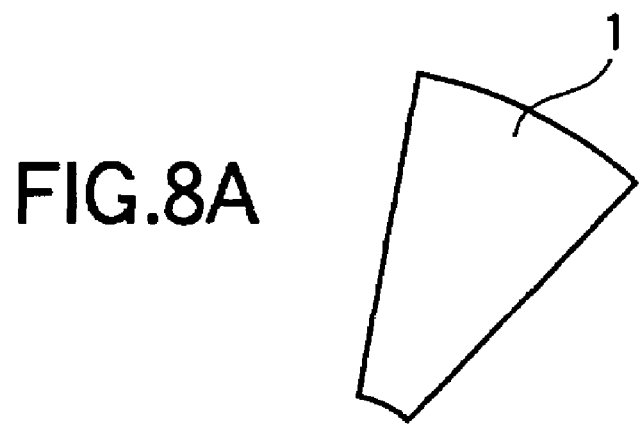
FIGS. 8A to 8C are diagrams illustrating an upper electrode of the piezoelectric thin film vibrator according to an embodiment of the invention.
Figure 8B:
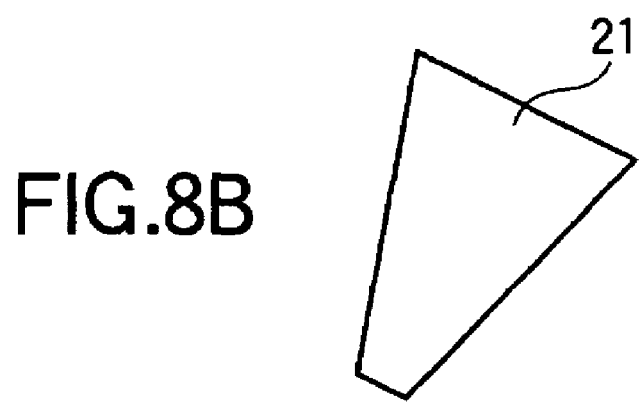
Figure 8C:
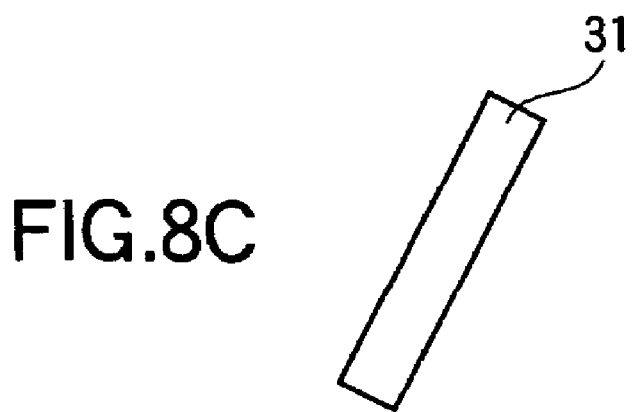

For example, in the embodiment, the upper electrodes 1a to 1d and the upper electrodes 11a to 11d in a fan shape shown in FIG. 8A are taken as an example. However, the invention is not limited thereto, which can of course be adapted to the cases of using an upper electrode 21 in a trapezoidal shape shown in FIG. 8B and an upper electrode 31 in a rectangular shape shown in FIG. 8C.

When the upper electrode 31 in a rectangular shape is used for the upper electrode, preferably, the antinode of the standing wave generated by applying voltage to the upper electrode 31 is formed in the upper electrode 31 in a rectangular shape. More preferably, the antinode of the standing wave is matched with the center of the upper electrode 31 in a rectangular shape.

Furthermore, in the embodiment, the piezoelectric thin film vibrator 6 is taken as an example in which the upper electrode part 1 and the upper electrode part 11 are separated from each other, but the invention is not limited thereto, which can be of course further adapted to a piezoelectric thin film vibrator 6 in which the piezoelectric thin film 2 is separated.

In addition, in the embodiment, the flexure traveling wave is generated which is rotated in the resonator in a disc shape, but the invention is not limited thereto. For example, a lower electrode and a piezoelectric thin film may be formed by epitaxial growth on one of the surfaces of a resonator in a rectangular thin plate, and upper electrodes may be placed thereon which are discretely and linearly arranged. With this configuration, linear drive can be implemented which generates flexure traveling waves that travel linearly.

Furthermore, in the embodiment, the piezoelectric thin film vibrator 6 is taken and described as an example in which the resonator 4 is formed of a monocrystalline silicon substrate, but the invention is not limited thereto, which can be of course adapted as well to a piezoelectric thin film vibrator 6 having a resonator 4 which is formed of a monocrystalline substrate of a material different from Si.

Furthermore, in the embodiment, the piezoelectric thin film vibrator 6 is taken as an example in which Pt is used as a material for the upper electrode parts 1 and 11 and the lower electrode 3, but the invention is not limited thereto. For example, the material may include at least one kind in metal materials formed of Au, Ir, Pd, Rh, Cu and Ag.

Furthermore, in the embodiment, the thin film is taken as an example in which the piezoelectric thin film 2 has the epitaxial film configured of lead zirconate titanate (PZT) formed on the epitaxial film configured of lead titanate (PLT) doped with La, but the invention is not limited thereto, it may be an epitaxial film configured of barium strontium titanate or lead titanate.

Furthermore, in the embodiment, the upper electrodes 1a and 1c are electrically connected to the lead electrode 53a, the upper electrodes 1b and 1d are electrically connected to the lead electrode 53b, the upper electrodes 11a and 11c are electrically connected to the lead electrode 53d, and the upper electrodes 11b and 11d are electrically connected to the lead electrode 53c, but the invention is not limited thereto. For example, this configuration may be done in which an insulating film is formed over throughout the surface of the upper electrode parts 1 and 11 and the piezoelectric thin film 2, the insulating film on each of the electrodes of the upper electrode parts 1 and 11 is opened to form a contact hole, first to fourth lead electrodes are formed on the insulating film, the upper electrodes 1a and 1c are electrically connected to the first lead electrode, the upper electrodes 1b and 1d to the second lead electrode, the upper electrodes 11a and 11c to the third lead electrode, and the upper electrodes 11b and 11d to the fourth lead electrode through the contact hole.

In addition, this configuration may be done in which a lead electrode formed in the same layer as the upper electrode parts 1 and 11 is combined with a lead electrode formed on the insulating film for use. For example, the upper electrodes 1a and 1c and the upper electrodes 11b and 11d are electrically connected to the lead electrodes 53a and 53c similarly formed as the embodiment, the upper electrodes 1b and 1d are electrically connected to a first lead electrode which is formed near the through hole 5 on the insulating film, and the upper electrodes 11a and 11c are electrically connected to a second lead electrode which is formed near the through hole 5 on the insulating film through the contact hole.

What is claimed is:

1. A piezoelectric thin film vibrator comprising:
    a resonator for generating a traveling wave;
    a first electrode disposed on the resonator;
    a piezoelectric thin film disposed on the first electrode; and
    a plurality of second electrodes disposed on the piezoelectric thin film,
    wherein a crystal orientation of the piezoelectric thin film is aligned to be normal to a crystal orientation of the first electrode.

2. The piezoelectric thin film vibrator according to claim 1, wherein the piezoelectric thin film is formed of lead zirconate titanate.

3. The piezoelectric thin film vibrator according to claim 1, wherein the resonator is formed of monocrystalline silicon.

4. The piezoelectric thin film vibrator according to claim 1, wherein the plurality of the second electrodes is arranged in a segment of circle.

5. The piezoelectric thin film vibrator according to claim 4, wherein the shape of the plurality of the second electrodes is a fan shape.

6. The piezoelectric thin film vibrator according to claim 4, wherein the shape of the plurality of the second electrodes is a trapezoidal shape.

7. The piezoelectric thin film vibrator according to claim 4, wherein the shape of the plurality of the second electrodes is a rectangular shape.

8. A driving apparatus comprising:
    the piezoelectric thin film vibrator according to claim 1; and
    an alternating current power source which applies alternating voltages to the plurality of the second electrodes, wherein phases of the alternating voltages are shifted by a half cycle between adjacent electrodes of the plurality of the second electrodes.

9. A piezoelectric motor comprising:
    a stator which has the driving apparatus according to claim 8; and
    a rotor which is disposed on the piezoelectric thin film vibrator.

10. A piezoelectric thin film vibrator comprising:
    a resonator for generating a traveling wave;
    a first electrode disposed on the resonator;
    a piezoelectric thin film disposed on the first electrode; and
    a plurality of second electrodes arranged in a segment of a circle on the piezoelectric thin film,
    wherein one of the second electrodes is electrically connected to a lead electrode that is formed on an outer perimeter side of the circle and another one of the second electrodes adjacent to the one of the second electrodes is electrically connected to a lead electrode that is formed on an inner perimeter side of the circle.

11. The piezoelectric thin film vibrator according to claim 10, wherein a phantom line that extends from a center of the piezoelectric thin film vibrator in the radial direction and divides the one of the second electrodes in equal halves and a phantom line that divides the another one of the second electrodes adjacent to the one of the second electrodes into equal halves form an angle $\theta_a$ of about $\pi/5$ radians.

12. The piezoelectric thin film vibrator according to claim 11, wherein the phantom line that divides the one of the second electrodes into equal halves and a phantom line that divides yet another one of the second electrode adjacent to the one of the second electrodes into equal halves form an angle $\theta_b$ of about $3\pi/10$ radians.

* * * * *